Feb. 24, 1970   W. R. MILLS, JR   3,497,692
DETECTION OF CHEMICAL BINDING OF HYDROGEN
Filed March 9, 1965   2 Sheets-Sheet 1

INVENTOR
WILLIAM R. MILLS, JR.
BY *Arthur F. Zobal*
ATTORNEY

INVENTOR
WILLIAM R. MILLS, JR.
BY Arthur F. Zobal
ATTORNEY

United States Patent Office 3,497,692
Patented Feb. 24, 1970

3,497,692
DETECTION OF CHEMICAL BINDING OF HYDROGEN
William R. Mills, Jr., Dallas, Tex., assignor to Mobil Oil Corporation, a corporation of New York
Continuation-in-part of application Ser. No. 377,916, June 25, 1964. This application Mar. 9, 1965, Ser. No. 438,200
Int. Cl. G01t 3/00
U.S. Cl. 250—83.1    13 Claims

ABSTRACT OF THE DISCLOSURE

An unknown sample is irradiated with a short pulse of high energy neutrons and two different energy neutron levels in the energy range of from 0.1 to 1 electron volt are absorbed from the neutrons issuing from the sample. Signals representative of the number of absorbed neutrons in the selected energy range are generated as function of time, and are recorded to indicate the relative proportions of oil and water in the unknown sample.

---

This application is a continuation-in-part of application Ser. No. 377,916, filed June 25, 1964, abandoned Apr. 27, 1965.

This invention relates to a determination of the environments in which hydrogen atoms are bound in molecules, and more particularly, to measurements dependent upon the hydrogen binding in the energy range of from about 0.1 to 1.0 electron volt. In a further aspect the invention relates to a detector system involving a pair of thermal neutron detectors having different or contrasting filters and connected to produce a measurement representative of the difference between the pulse counting rates of the two detectors.

In the identification of the character of fluids which may saturate earth formations, it is highly desirable to be able to distinguish between water and oil. It is further desirable to determine the percentage of water and oil in the mixture in a given formation or sample thereof. Such measurements are of interest both from the standpoint of measurements of core samples, as well as measurements in situ by well logging techniques.

In accordance with the present invention, oil may be distinguished from water in formations surrounding a borehole. The invention is based upon the difference in the neutron moderation properties of the hydrogen atoms when the atoms are in different molecular configurations with other atoms. More particularly, in accordance with the present invention, the character of oil-water mixtures is sensed by irradiating the mixture with pulses of neutrons following which the neutrons in each pulse become moderated to thermal levels. By differentially absorbing on the basis of two different energy dependent functions, neutrons emanating from the mixture at energies in the region which is primarily affected by the binding of hydrogen in a water molecule and in an oil molecule, and measuring the number of neutrons which are not absorbed, the nature of the molecule may be determined.

In a further aspect of the invention, the number of neutrons moderated by a test sample, as sensed by detector systems having energy dependent responses which are different but which are in the region of from about one-tenth to one electron volt, are detected. Signals representative of the outputs of the detectors are subtracted to produce a differential function indicative of the relative proportions of oil and water in the sample.

Figure 1:
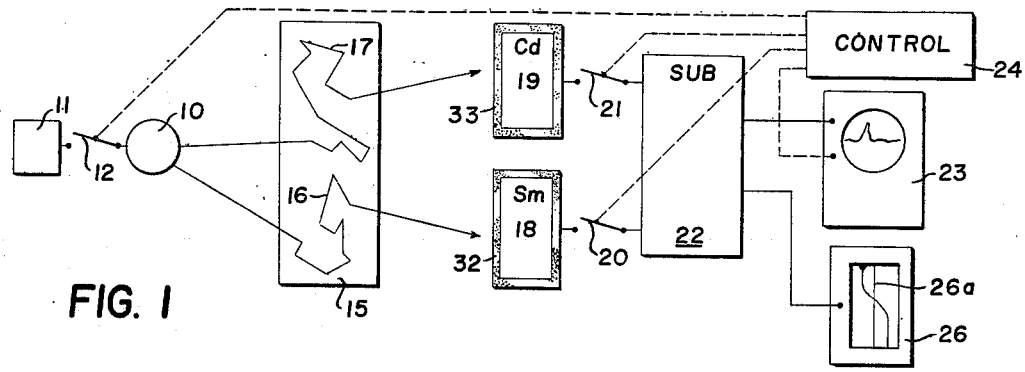
Figure 2:
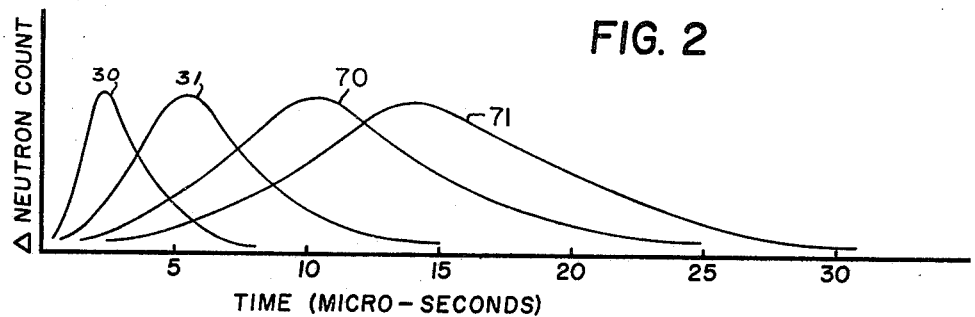
Figure 3:
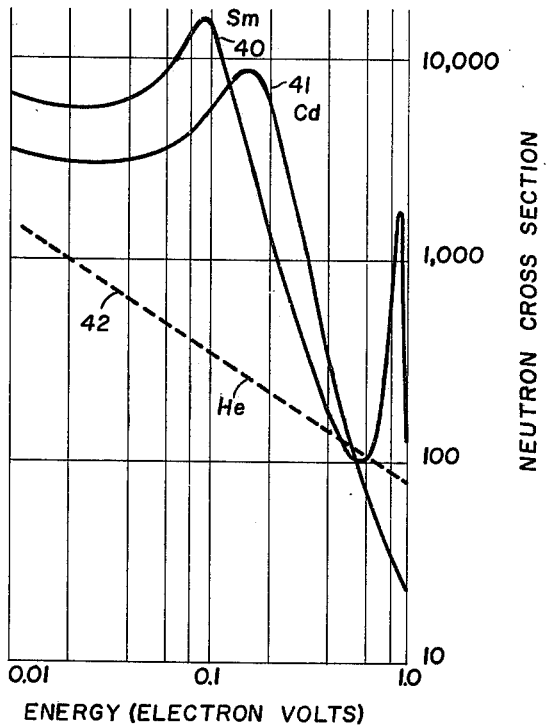
Figures 4, 5:
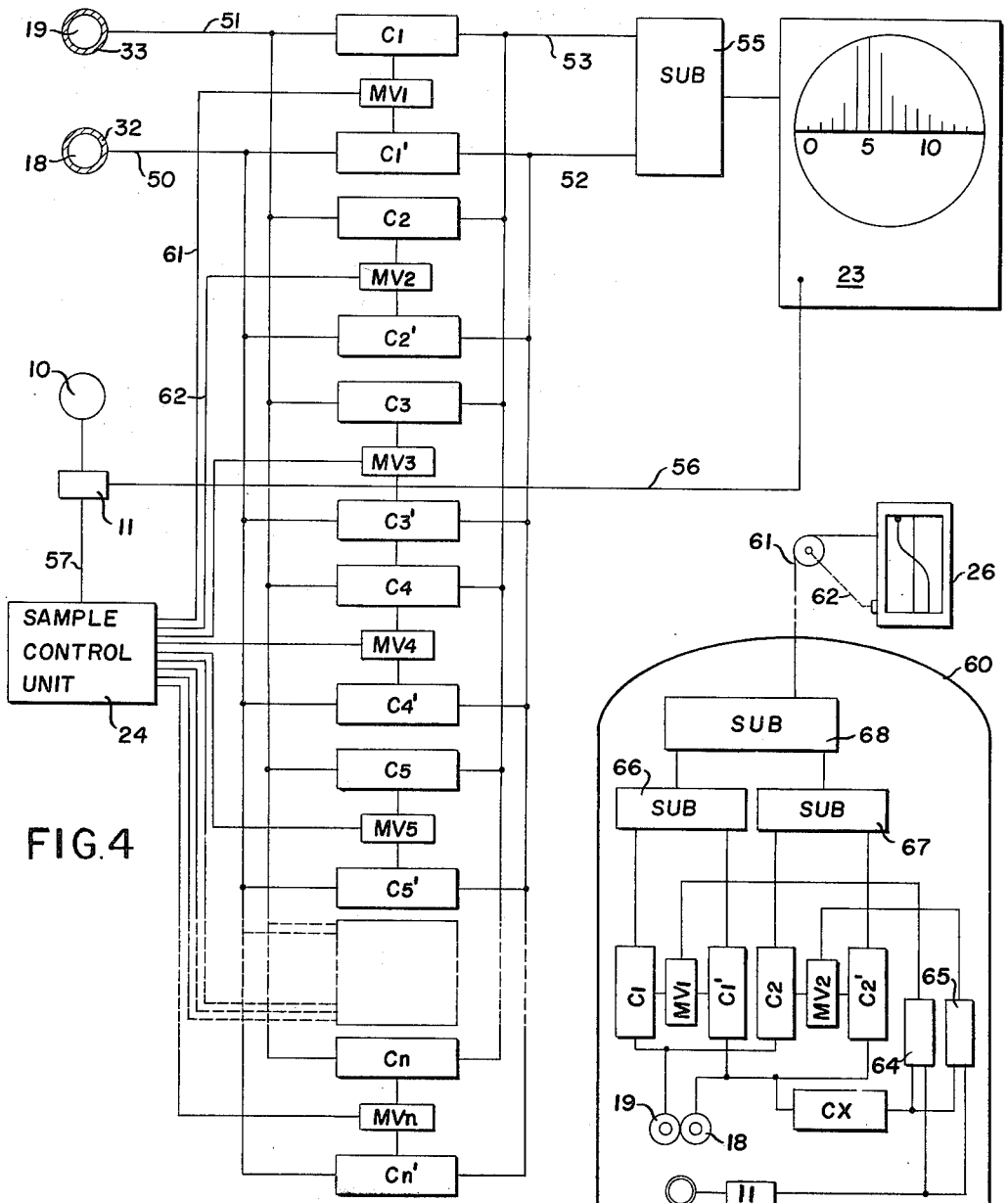

For a more complete understanding of the present invention and for further objects and advantages thereof, reference may now be had to the following description taken in conjunction with the accompanying drawings in which:

FIGURE 1 diagrammatically illustrates a measuring system including two filtered helium-3 counters;
FIGURE 2 illustrates counting rates as a function of time for neutrons moderated in water and in a liquid hydrocarbon;
FIGURE 3 illustrates the neutron cross sections of samarium and cadmium;
FIGURE 4 is a more detailed drawing of one embodiment of FIGURE 1; and
FIGURE 5 illustrates a porosity compensated logging system.

Referring now to FIGURE 1, there is illustrated a high-energy neutron source 10 which may be pulsed or periodically energized from a source 11 by the actuation of control means represented by a switch 12. By this means, time-spaced bursts or pulses of high-energy neutrons will be produced by the source 10. A sample 15 of material adjacent to the source 10 is thus bombarded with pulsed high-energy neutrons. If the sample 15 is a core such as obtained during well drilling operations and is saturated with a mixture of oil and water, the neutrons will be moderated as they travel along paths which are somewhat random in nature. Two such paths 16 and 17 are illustrated in FIGURE 1. Neutrons which emerge from the sample 15 are sensed by a pair of detectors 18 and 19. The detectors are connected by means of switches 20 and 21 to a subtraction unit 22, the outputs of which are applied to an oscilloscope 23 and to a recorder 26. Switches 12, 20, and 21 are controlled by a unit 24.

In FIGURE 2, curves 30 and 31 have been illustrated with pulse rate plotted as ordinates and with time as abscissa. Time is zero in each cycle at the instant at which the pulse of neutrons from source 10 is generated, or preferably, terminated. The measured pulse rate represents the number of neutrons emanating from the sample 15 per unit time following the neutron pulse from source 10. Curves 30 and 31 represent differences between the outputs of the two detectors 18 and 19 as a function of time following each neutron pulse.

Curve 30 illustrates the variation in the difference between the outputs of counters 18 and 19 for bulk water. Curve 30 peaks at about two microseconds and approaches zero count rate at all other times. The water molecule is relatively light and thus the neutron will be moderated into the range in which the detectors 18 and 19 are sensitive more rapidly than in oil. Curve 31 illustrates the differential count rate for bulk oil. Since oil molecules are substantially larger than water molecules, the neutrons require a longer period to be moderated to the level to which counters 18 and 19 respond than when moderated in water. The curve 31 peaks at about five microseconds. By taking the differential count rate as between counters 18 and 19, the curves 30 and 31 exhibit relatively sharp and distinctive peaks. They provide a basis for distinguishing between oil and water. For mixtures of oil and water in the bulk, the position of the peak in the response from a given sample will be indicative of the relative proportions of oil and water in the mixture. The relatively sharp and distinguishing character of the response of the system is provided in accordance with the present invention by utilizing detectors having unique characteristics.

More particularly, in accordance with the present invention, low-energy neutron detectors 18 and 19 are provided with absorbers 32 and 33, FIGURE 1, which have essentially differing character. The absorbers are selected as to have good resonance or absorption character within the energy region of interest and in no other neutron-energy region. The energy region of interest is from about 0.1 to 1.0 electron volt, as shown in FIGURE 3. Absorbers which have the requisite resonance characteristics within the above energy range include the rare earths. The absorbers 32 and 33 which surround the detectors 18 and 19 will then absorb neutrons emanating from the sample 15 preferentially.

The detector 18 may be a helium-3 neutron detector of the type illustrated and described in U.S. Patent 3,102,198 to Bonner et al. The coating 32 is of samarium, the cross section for which is illustrated in FIGURE 3. It will be noted that samarium has a peak 40 in its cross section at about 0.09 electron volt. In contrast, the detector 19 is the same as detector 18 but has a coating 33 of a different material, preferably cadmium. The cross section for cadmium has a peak 41 at about 0.18 electron volt.

A third curve 42 is plotted in FIGURE 3 to illustrate the cross section of an unshielded helium-3 neutron detector. The helium-3 detector has relatively high cross section at very low neutron energy levels but drops off rapidly with increasing energy, particularly as the energy level approaches one electron volt. Thus, in the region above the peaks 40 and 41, due to the combination of the helium-3 detector cross section and the absorption characteristics of the coatings 32 and 33, the overall response of the detector is relatively negligible. However, the cadmium-covered detector, having peak 41, will be somewhat responsive to neutrons having energies below the peak 41 since neutrons will not be as readily absorbed as at the peak 41. At energy levels well above the peak 41, the low cross section of the counter, as shown by line 42, results in low response even though the absorption of neutrons by cadmium above peak 41 is low. Thus, the detector 19 will have a substantial response to neutrons in the energy region of from about 0.2 to 0.8 electron volt.

The samarium-covered detector 18 will have little, if any, output for neutron energies below about 0.10 electron volt. In the range of from about 0.1 to 0.6 electron volt the detector 18 will have a substantial response. Thus, in the region between 0.1 to 0.8 electron volt, there will be a substantial difference in the responses of the two detectors 18 and 19. Below about 0.10 electron volt, the samarium and cadmium cross section curves have about the same shape. Thus, in these regions, the difference between the two outputs will approach zero and can be made to be zero by use of coatings of proper thickness. Thus there may be provided a relatively sharp or discriminating detecting arrangement. The discrimination is present by reason of the large difference in the cross sections of the coating materials 32 and 33 on detectors 18 and 19 in the energy region of from 0.1 to 0.8 electron volt. A differential function, the difference between the outputs of detectors 18 and 19, will be thus produced at the output of the subtraction unit 22 to provide an indication of whether or not the moderating material is comprised of a small molecule, such as water, or of a large molecule, such as oil.

The variation in the differential function is dependent upon the process by which neutrons lose energy. Scattering takes place primarily due to collision of the neutrons with hydrogen atoms in the moderating material. When the energy of a neutron falls below about one electron volt, then the hydrogen atoms appear to be chemically bound to the other atoms in the molecule. The neutron can no longer collide with only a hydrogen atom. It must collide or react with, or impart energy to, the whole molecule. The recoil of the neutron is greater and the loss of energy to the molecule is less for the heavy molecule. Therefore, a neutron will spend more time in a moderating material formed of large hydrocarbon molecuels than in water, for example, before it is moderated to the energy range of from about 0.1 to 1.0 electron volt.

From FIGURE 3 is will be seen that the samarium peak is below 0.1 electron volt, whereas the cadmium peak is somewhat above it. By taking the difference between the responses of the two detectors, the time interval that a neutron remains in the energy of from 0.1 to 1.0 electron volt may be portrayed. The curve 30 represents the variations with time in the pulse rate for a bulk water moderator. The curve 31 represents the variations with time in the pulse rate for a bulk oil moderator.

Since cadmium and samarium differ substantially in absolute magnitude of the cross section, the coatings on the detectors 18 and 19 should be adjusted in thickness. They should stop all neutrons of about 0.025 electron volt. The coatings should be essentially black or totally shielding at this energy level. The coating thickness may also compensate for the difference in the height of peaks 40 and 41 in the cross sections of FIGURE 3. By way of example, a cadmium coating of pure cadmium metal would satisfy this requirement if 0.035 inch thick. Samarium, in pure metal form, 0.020 inch thick would be of the order of magnitude necessary. Samarium oxide, more readily available than samarium metal, of a thickness of 0.40 inch would be satisfactory.

Samarium and cadmium have been referred to as specific and preferred examples of suitable coating materials. Erbium, europium, and lutecium may also be employed. It will be preferable to use samarium for the lower energy peak with any one of lutecium, cadmium, erbium, or europium forming the coating for the second detector. Europium or erbium could be used with either cadmium, lutecium, or samarium. Lutecium would be used only with europium or erbium, since lutecium has a peak at about 0.14 electron volt and thus is intermediate the range of samarium and cadmium.

It will be recognized that different detectors may be employed. Helium-3 detectors have been mentioned. Sodium iodide counters or boron trifluoride neutron detectors may also be found suitable, with conventional adaptation modifications. In any case, the detectors are coated with a material which serves to shield them from neutrons selectively within the range of from 0.1 to 1.0 electron volt. The resonances of the two coating materials preferably are spaced apart within this range so that the character of the environment in which the neutrons are moderated will be reflected in the pulse rate of neutrons emerging from the moderating material.

The pulsed neutron source means 10–12 of FIGURE 1 may be of the type known in the art. Such a system is illustrated and described in U.S. Patent 2,991,364 to Goodman. In this patent, a DT source in a logging tool is gated on and off to irradiate surrounding media with neutrons during repetitive, relatively short intervals of time to define successive operating cycles. In accordance with the present invention, where such a source is employed, the pulse rate differential appearing at the output of the subtraction unit 22 following each burst of neutrons is applied to a suitable registering system.

The present invention may be used for well logging. It may also be used for laboratory measurements, as on a core sample 15. In either case, that portion of the system represented by switches 20 and 21 is selectively actuated to define spaced time gates in each cycle. The switches 20 and 21 may be selectively closed for a series of counting operations with the unit 22 providing a time-varying total of the counts from the two detectors, as well as a difference output.

An embodiment of the system shown diagrammatically in FIGURE 1 is shown in more detail in FIGURE 4. Detectors 18 and 19 are connected to input buses 50 and 51 which lead to counters $C1'$ and $C1$. The bus 51 also leads to counters $C2, C3-Cn$. Bus 50 also leads to counters $C2'-Cn'$. The outputs of counters $C1-Cn$ are applied by way of channel 53 to one input of a subtraction unit 55. The outputs of counters $C1'-Cn'$ are applied by way of bus 52 to the second input of subtraction unit 55. The output of the subtraction unit 55 is applied to an indicator or storage unit such as the oscilloscope 23. The time scale on the oscilloscope 23 has a zero time corresponding with the neutron pulse from source 10. More particularly, a sync pulse is applied by way of channel 56 from control unit 11 at the instant the source 10 is pulsed. The sync pulse initiates the sweep on the oscilloscope 23. The control unit 11 is also coupled by way of channel 57 to the sample control unit 24. Unit 24 applies gating pulses to each of a plurality of multivibrators or control gates. More particularly, control gate MV1 controls counters C1 and C1'. Gate MV2 controls counters C2 and C2'. Control gate MVn controls counters Cn and Cn'. While a limited number of pairs of counters have been shown in FIGURE 4, it is to be understood that as many sets of counters may be employed as necessary to scan the time scale of interest. For this purpose, the pulse on channel 61 leading from control 24 would appear at one microsecond after termination of radiation from source 10. The gate MV1 would then turn counter C1 and C1.' on for a predetermined measuring interval, such as one-half, one, or two microseconds, as may be desired. The signal on channel 62 would energize counters C2 and C2' by means of gate MV2 beginning at two microseconds. The remaining pairs will be sequentially energized. The signal output from each of the pairs of multivibrators and counters applied to the subtraction unit 55 would cause pulses or signals to appear on the oscilloscope thereby portraying the time response of a given sample to the radiation from source 10. In the embodiment shown in FIGURE 4, the curve peaks at about five microseconds which, for a bulk sample, would represent a substantially pure oil sample. Thus, the control unit 24 may comprise a counter having a plurality of output channels leading to successive multivibrators MV1–MVn. The signal from the cadmium-covered detector 19 is to be subtracted in each case from the signal derived from the samarium-covered detector 18. By use of the several time gates centered at points spaced along the time axis, the entire time axis may be scanned so that there will be applied to the oscilloscope 23 from a subtraction unit 55 a voltage function, a characteristic of which varies as a function of time in proportion to the difference between the number of epithermal neutrons detected by detectors 18 and 19 in the interval following the sync pulse.

The sync pulse on bus 56, FIGURE 4, may be produced in well-known manner such as described in the above-identified patent to Goodman. The multivibrators MV1–MVn may be of the type employed for switching applications in high-speed logic circuits. Such a multivibrator is shown in Handbook of Automation Computation and Control, volume 2, by Grabbe et al. (John Wiley & Sons, Inc., 1959), at page 16–08 and illustrated in FIGURE 5 on page 16–09.

The counters C1, C1', and Cn–Cn' may be of the type manufactured and sold by Hewlett-Packard of Palo Alto, Calif., and identified as Electronic Counter Model 524C. This counter is representative of known units responsive to control pulses as from one of the multivibrations of FIGURE 4 and responsive to information pulses during a time window which is selectable internally, as to window length, to provide an analog output voltage. With the analog voltage output available, well-known analog subtraction units may be employed.

While the system shown in FIGURE 4 involves a multiplicity of counters, it will be appreciated that a logging operation may be carried out using only two pair of counters to produce an analog output function on a chart where the chart control generally is as well known in the art and as shown by the Bonner et al. Patent 2,905,826. Alternatively, the three dimensions of time, amplitude, and depth may be recorded on a single chart in the manner disclosed by the U.S. Patent 2,654,064 to Broding, thus employing the output from the system of FIGURE 4.

While counters have been included in FIGURE 4 in number as great as the number of sampling points to be employed, it would be understood that a single pair of counters may be employed with output signals selectively gated and integrated to provide representations of the difference between the numbers of pulses sensed by detectors 18 and 19 for each of a plurality of time windows along the time axis.

For calibration of the system of FIGURE 4, a series of measurements would be made using different bulk samples. A first bulk sample of pure water would result in the curve 30 of FIGURE 2. The relative proportions of water and oil would then be varied in subsequent samples in selected steps to produce a series of curves peaking at times later than the two-microsecond peak of curve 30. For pure oil, the bulk sample would exhibit a peak such as shown in the curve 31 of FIGURE 2.

For oil well logging operations or for measurements of core samples, the porosity will also affect the location of the peaks along the time scale. For example, a core such as from sandstone formation saturated with water would exhibit a peak in the curve 30 which would occur later in time than two microseconds. The delay in time is experienced because in a core there are fewer water nuclei per unit volume to serve as moderator and thus a longer time is required to moderate the neutrons to the energy level suitable for detectors 18 and 19. Thus, if core samples are to be analyzed in accordance with the present invention, a series of calibration tests for varying porosities and varying proportions of water and oil will be run.

Similarly, in logging a well, the saturation of the formations will have an effect on the location of the peak for a given mixture of oil and water. In order to provide calibrations dependent upon variations in porosity, a second log may be run which reflects porosity. Such a log may be obtained through well-known techniques. A porosity log may then be used to interpret the log obtained with the system of FIGURE 4.

In a further aspect of the invention, a log may be produced which is corrected for porosity in the manner shown in FIGURE 5. In FIGURE 5, an exploring unit 60 is adapted to be moved along the length of a borehole and is coupled to the earth's surface by way of a cable 61 which leads to the recorder 26. The chart on the recorder is driven by way of linkage 62 so that the chart length is proportional to the depth of the unit 60 in the borehole. Detector 18 is connected to counter C1' and C2'. Detector 19 is connected to counters C1 and C2. Counters C1 and C1' are controlled by a multivibrator MV1. Counters C2 and C2' are controlled by multivibrator MV2. Multivibrator MV1, in response to a sync pulse from control unit 11 by way of delay unit 64, will initiate or energize counters C1 and C1' at a time following the pulse from source 10 at which the water peak will occur. Signals from counters C1 and C1' are then applied to a first subtraction unit 66. Delay unit 65 similarly controls gate MV2 in dependence upon the location of the oil peak. Counters C2 and C2' are energized by gate MV2 at a time corresponding with the location of the peak in the oil curve. The signals from counters C2 and C2' are applied to a second subtraction unit 67. The difference signals from subtraction units 66 and 67 are then applied to a third subtraction unit 68, the output of which is transmitted to the earth's surface by way of channel 61. The sampling intervals controlled by the delay units 64 and 65 will be variable along the time scale in response to the output of counter CX. The counter CX is connected directly to the output of the samarium-covered detector 18 and records the total count following each pulse from source 10. The periods of the delay units 64 and 65 will be variable and will be determined by calibration runs in test borehole units where porosity is known, is controlled, or varied over the range to be encountered in the borehole logging operations. Where bulk water and bulk oil samples peak at two microseconds and five microseconds, respectively, as shown in FIGURE 2, a sandstone saturated with water only and having a porosity of about 20% will exhibit a peak at about 10 microseconds, as represented by curve 70. The same formation, saturated with oil only, will exhibit a peak at about 12–14 microseconds, as represented by curve 71. By taking measurements at times corresponding with location of the peaks for water and for oil, the difference between such signals will indicate the relative proportions of oil and water. If a water peak is greater in magnitude than an oil peak, then the formation will be known to be predominantly saturated with water rather than oil.

If desired, the subtraction unit 68 may be eliminated and two curves may be transmitted to the surface from which the difference may be obtained. Alternatively, the two curves may be compared for determination of the fluid content of the formations.

Further, systems may be used having only two counters. Two counters C1 and C1' would be employed with a control system to sweep or select the time windows along the time scale rather than switching from one pair of counters to another as above described. The system of FIGURE 4 has been employed herein, in order to portray the function of the system. The duplication of counters in practice is simplified to two counters plus control means, which may take the form of relatively simple time control of type well known in the art for sampling sequentially successive time increments from time-varying functions.

The energy range primarily of interest, as above noted, involves neutrons of energies of from about 0.1 to about 1.0 electron volt. The detectors above described are peaked at spaced points primarily in the lower end of this range. The time intervals during which measurements are to be made are dependent upon the total number of molecules present in the zone of influence. Measurements preferably are made during the time interval following termination of each neutron pulse from the neutron source preferably in the range of from about two to about six microseconds for bulk samples. For liquids in a porous body, the period may be as long as twenty microseconds.

The invention has been described in connection with use of neutron pulses from a source which involves changing from zero neutron radiation to maximum and back to zero in a time interval short compared to the period over which the peaks of the curves 30 and 31 are spread. However, it is to be understood that the measurements may be made relative to the instant at which neutron radiation from a source is abruptly lowered from one level to another. Thus, for the purpose of the invention, a pulsed neutron source will be considered to include a source in which the neutron radiation may be abruptly changed from one level to a lower level.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a borehole logging tool system for sensing the difference between a water an an oil environment of bound hydrogen atoms excited by pulsed high-energy neutrons, the combination which comprises:
  (a) a first slow neutron detector.
  (b) a first filter formed of material from the group consisting of samarium, lutecium, cadmium, erbium, and europium for said first detector to peak the efficiency of the detector at a first point in the energy range of between 0.1 and 1.0 electron volt,
  (c) a second slow neutron detector,
  (d) a second filter of a different material than said first filter from said group and with a thickness related to the thickness of said first filter in dependence upon the absolute magnitude of the cross section of the respective materials for said second detector to peak the efficiency of the detector at a second point spaced from said first point in said energy range,
  (e) subtraction means connected to both of said detectors to produce an output signal dependent upon the difference between pulses detected by the first detector and by the second detector, and
  (f) means for registering said output signal.

2. The combination set forth in claim 1 in which said first filter is of samarium and said second filter is of the group consisting of lutecium, cadmium, erbium, and europium.

3. The combination set forth in claim 1 in which said first filter is of cadmium and said second filter is from the group consisting of samarium, lutecium, erbium, and europium.

4. The combination set forth in claim 1 in which said first filter is from the group consisting of cadmium, lutecium, and samarium, and said second filter is from the group consisting of europium and erbium.

5. The combination set forth in claim 1 in which said first filter is of lutecium and said second filter is of europium.

6. The combination set forth in claim 1 in which said first filter is of samarium and said second filter is of cadmium.

7. The combination set forth in claim 1 in which said first filter is of samarium and said second filter is of lutecium.

8. The combination set forth in claim 1 in which said first filter is of samarium and said filter is of erbium.

9. The combination set forth in claim 1 in which said first filter is of samarium and said second filter is of europium.

10. The combination set forth in claim 1 in which both detectors are helium-3 neutron detectors.

11. The combination set forth in claim 3 in which the relative thicknesses of said first filter and said second filter are inversely proportional to the value of the cross section of the respective filter materials at the thermal energy of about 0.025 electron volt.

12. The combination set forth in claim 1 in which the input channels to said subtraction means are normally open and are closed for different predetermined time gates following each neutron pulse.

13. The combination set forth in claim 1 in which the input channels to said subtraction means are normally open and are closed for time gates at about two microseconds and five microseconds respectively in each time interval following each neutron pulse.

References Cited

UNITED STATES PATENTS 3,385,969   5/1968   Nelligan _____ 250—83.1

ARCHIE R. BORCHELT, Primary Examiner

U.S. Cl. X.R.

250—71.5, 83.6

PO-1050
(5/69)

UNITED STATES PATENT OFFICE
CERTIFICATE OF CORRECTION

Patent No. 3,497,692                    Dated   February 24, 1970

Inventor(s)    William R. Mills, Jr.

It is certified that error appears in the above-identified patent and that said Letters Patent are hereby corrected as shown below:

Column 3, line 46, "thickness" should be --thicknesses--;
         line 71, "cuels" should be --cules--;
         line 73, "is" should be --it--.
Column 4, line 2, after "energy" insert --region--;
         line 11, "vvolt" should be --volt--.
Column 5, line 17, "Cl.'" should be --Cl'--.
Column 7, line 58, "an an" should be --and an--;
         line 61, after "detector" the period (.) should be a comma (,).
Column 8, line 42, "claim 3" should be --claim 1--. Original claim 14 (now claim 11 in printed patent) was made to depend on claim 3 per Paper No. 9 dated December 16, 1968. Claim 3 was renumbered claim 1 in printed patent; therefore, present claim 11 should be made to depend on present claim 1.

SIGNED AND
SEALED
JUL 14 1970

(SEAL)
Attest:

Edward M. Fletcher, Jr.
Attesting Officer

WILLIAM E. SCHUYLER, JR.
Commissioner of Patents